United States Patent
Bains

(10) Patent No.: US 7,836,380 B2
(45) Date of Patent: Nov. 16, 2010

(54) DESTINATION INDICATION TO AID IN POSTED WRITE BUFFER LOADING

(75) Inventor: Kuljit S. Bains, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 1051 days.

(21) Appl. No.: 11/591,127

(22) Filed: Oct. 31, 2006

(65) Prior Publication Data

US 2008/0115039 A1 May 15, 2008

(51) Int. Cl.
*G11C 29/00* (2006.01)
(52) U.S. Cl. .................... 714/773; 714/766
(58) Field of Classification Search ............... 714/766, 714/773
See application file for complete search history.

(56) References Cited

U.S. PATENT DOCUMENTS

| | | | | |
|---|---|---|---|---|
| 5,052,001 A * | 9/1991 | Jeppesen et al. | ............ | 714/802 |
| 5,088,092 A * | 2/1992 | Jeppesen et al. | ............ | 714/802 |
| 5,117,428 A * | 5/1992 | Jeppesen et al. | ............. | 714/45 |
| 5,172,379 A * | 12/1992 | Burrer et al. | ................ | 714/767 |
| 5,280,601 A * | 1/1994 | Desai et al. | .................... | 711/5 |
| 5,343,426 A * | 8/1994 | Cassidy et al. | ......... | 365/189.02 |
| 5,457,703 A * | 10/1995 | Kakuta et al. | ............... | 714/766 |
| 5,522,032 A * | 5/1996 | Franaszek et al. | ............. | 714/6 |
| 5,555,250 A * | 9/1996 | Walker et al. | ................ | 714/763 |
| 5,572,660 A * | 11/1996 | Jones | ............................ | 714/6 |
| 5,615,355 A * | 3/1997 | Wagner | ..................... | 711/167 |
| 5,638,534 A * | 6/1997 | Mote, Jr. | ...................... | 711/158 |
| 5,666,494 A * | 9/1997 | Mote, Jr. | ...................... | 711/167 |
| 5,680,579 A * | 10/1997 | Young et al. | ................. | 711/157 |
| 5,701,270 A * | 12/1997 | Mohan Rao | ........... | 365/230.03 |
| 5,748,539 A * | 5/1998 | Sproull et al. | .......... | 365/189.04 |
| 5,867,733 A * | 2/1999 | Meyer | ......................... | 710/74 |
| 5,897,667 A * | 4/1999 | Miller et al. | ................ | 711/218 |
| 5,898,891 A * | 4/1999 | Meyer | ......................... | 710/33 |
| 5,905,858 A * | 5/1999 | Jeddeloh | ...................... | 714/52 |
| 5,941,960 A * | 8/1999 | Miller et al. | ................... | 710/35 |
| 5,978,958 A * | 11/1999 | Tanaka et al. | ............... | 714/804 |
| 6,070,262 A * | 5/2000 | Kellogg et al. | .............. | 714/763 |
| 6,078,976 A * | 6/2000 | Obayashi | .................... | 710/315 |
| 6,119,245 A * | 9/2000 | Hiratsuka | ....................... | 714/7 |
| 6,151,658 A * | 11/2000 | Magro | ......................... | 711/110 |
| 6,263,395 B1 * | 7/2001 | Ferguson et al. | ............ | 710/262 |
| 6,324,110 B1 * | 11/2001 | Leung et al. | ................. | 365/207 |

(Continued)

OTHER PUBLICATIONS

Pending U.S. Appl. No. 11/364,107, filed Feb. 27, 2006. Inventor: Bains, K.

(Continued)

*Primary Examiner*—Joseph D Torres
(74) *Attorney, Agent, or Firm*—Philip A. Pedigo

(57) ABSTRACT

Embodiments of the invention are generally directed to systems, methods, and apparatuses for a destination indication to aid in posted write buffer loading. In some embodiments, a memory device includes a posted write buffer having a first element and a second element. The memory device may also include logic to detect a destination indication associated with received write data. In some embodiments, the logic determines whether to store the received write data in the first element or the second element based, at least in part, on the destination indication. Other embodiments are described and claimed.

16 Claims, 9 Drawing Sheets

U.S. PATENT DOCUMENTS

| | | | |
|---|---|---|---|
| 6,556,952 B1 * | 4/2003 | Magro | 702/183 |
| 6,598,132 B2 * | 7/2003 | Tran et al. | 711/154 |
| 6,625,777 B1 * | 9/2003 | Levin et al. | 714/774 |
| 6,937,242 B2 * | 8/2005 | Wu et al. | 345/519 |
| 7,054,987 B1 * | 5/2006 | Reed et al. | 710/310 |
| 7,111,142 B2 * | 9/2006 | Spencer et al. | 711/170 |
| 7,117,421 B1 * | 10/2006 | Danilak | 714/763 |
| 7,200,713 B2 * | 4/2007 | Cabot et al. | 711/108 |
| 7,221,615 B2 * | 5/2007 | Wallner et al. | 365/230.03 |
| 7,272,757 B2 * | 9/2007 | Stocken | 714/718 |
| 7,353,438 B2 * | 4/2008 | Leung et al. | 714/720 |
| 7,409,492 B2 * | 8/2008 | Tanaka et al. | 711/103 |
| 7,640,390 B2 * | 12/2009 | Iwamura et al. | 711/103 |

OTHER PUBLICATIONS

Pending U.S. Appl. No. 11/479,067, filed Jun. 30, 2006. Inventor: Bains, K.

Dell: A White Paper on the Benefits of Chipkill-Correct ECC for PC Server Main Memory; IBm Microelectronics Division—Rev. Nov. 19, 1997, pp. 1-23.

* cited by examiner

| | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| 0 | WD0=1 | 1 | 2 | 3 | 4 | 5 | CRC | CRC | WD0=1 | | | | | | | | CRC |
| 1 | 6 | 0 | 1 | 2 | 3 | 4 | 5 | 13 | CRC | | | g1 | ecc0 | ecc1 | ecc2 | ecc3 | CRC | CRC |
| 2 | s0 | 7 | 8 | 9 | 10 | 11 | 12 | 20 | CRC | Wme=1 | | | ecc4 | ecc5 | ecc6 | ecc7 | | CRC |
| 3 | s1 | 14 | 15 | 16 | 17 | 18 | 19 | 70 | CRC | | | | | | | | | CRC |
| 4 | 71 | 64 | 65 | 66 | 67 | 68 | 69 | 78 | CRC | WD1=1 | | | ecc8 | ecc9 | ecc10 | ecc11 | | CRC |
| 5 | WD1=0 | 79 | 80 | 81 | 82 | 83 | 84 | CRC | CRC | | | | ecc12 | ecc13 | ecc14 | ecc15 | CRC | CRC |

Section 506:

| 18 | 19 | 20 | 21 | 22 | 23 | 24 | 25 | 26 |
|---|---|---|---|---|---|---|---|---|
| WD0=1 | 21 | 22 | 23 | 24 | 25 | 26 | CRC | CRC |
| 27 | 28 | 29 | 30 | 31 | 32 | 33 | 34 | CRC |
| Wme=0 | 35 | 36 | 37 | 38 | 39 | 40 | 41 | CRC |
|  | 85 | 86 | 87 | 88 | 89 | 90 | 91 | CRC |
| 92 | 93 | 94 | 95 | 96 | 97 | 98 | 99 | CRC |
| WD1=1 | 100 | 101 | 102 | 103 | 104 | 105 | CRC | CRC |

Section 508:

| 27 | 28 | 29 | 30 | 31 | 32 | 33 | 34 | 35 |
|---|---|---|---|---|---|---|---|---|
| WD0=1 | 42 | 43 | 44 | 45 | 46 | 47 | CRC | CRC |
| 48 | 49 | 50 | 51 | 52 | 53 | 54 | 55 | CRC |
| 56 | 57 | 58 | 59 | 60 | 61 | 62 | 63 | CRC |
| 106 | 107 | 108 | 109 | 110 | 111 | 112 | 113 | CRC |
| 114 | 115 | 116 | 117 | 118 | 119 | 120 | 121 | CRC |
| WD1=1 | 122 | 123 | 124 | 125 | 126 | 127 | CRC | CRC |

DESTINATION INDICATION TO AID IN POSTED WRITE BUFFER LOADING

TECHNICAL FIELD

Embodiments of the invention generally relate to the field of integrated circuits and, more particularly, to systems, methods and apparatuses for a destination indication to aid in posted write buffer loading.

BACKGROUND

Memory devices are susceptible to errors such as transient (or soft) errors. If these errors are not handled properly, they can cause a computing system to malfunction. Redundant information in the form of error correction code (ECC) bits can be used to improve overall system reliability. In some cases, additional memory devices are added to a system to support the ECC bits. In other cases, the same memory device (e.g., a dynamic random access memory (DRAM) device) can be used for both ECC and non-ECC modes.

A posted write buffer (PWB) refers to a buffer to which data is posted prior to being retired to the memory array of a memory device. In some cases, the PWB may be divided into two (or more) elements each of which may be physically located close to a corresponding portion of the memory array. In such cases, writing data to the memory array may include a two step process. First, a copy of the write data may be posted to both elements of the PWB. Subsequently, a column address strobe (CAS) is used to provide the destination address to the PWB. The copy of the write data that is posted to the element of the PWB that is closest to the appropriate part of the memory array is written into the array. This arrangement, however, does not work well if the device is capable of operating in an ECC mode.

BRIEF DESCRIPTION OF THE DRAWINGS

Embodiments of the invention are illustrated by way of example, and not by way of limitation, in the figures of the accompanying drawings in which like reference numerals refer to similar elements.

FIGS. 5A and 5B illustrate selected aspects of a sequence of write data frames, according to an embodiment of the invention.

DETAILED DESCRIPTION

Embodiments of the invention are generally directed to systems, methods, and apparatuses for using a destination indicator to aid with loading a posted write buffer (PWB). In some embodiments, a memory device includes a PWB having a first element and a second element (e.g., a split PWB). The memory device may also include logic to detect a destination indication associated with received write data. In some embodiments, the logic determines whether to store the received write data in the first element or the second element based, at least in part, on the destination indication. As is further described below, the ECC bits covering the write data may be posted to the element of the PWB which is not storing the write data.

Figure 1:
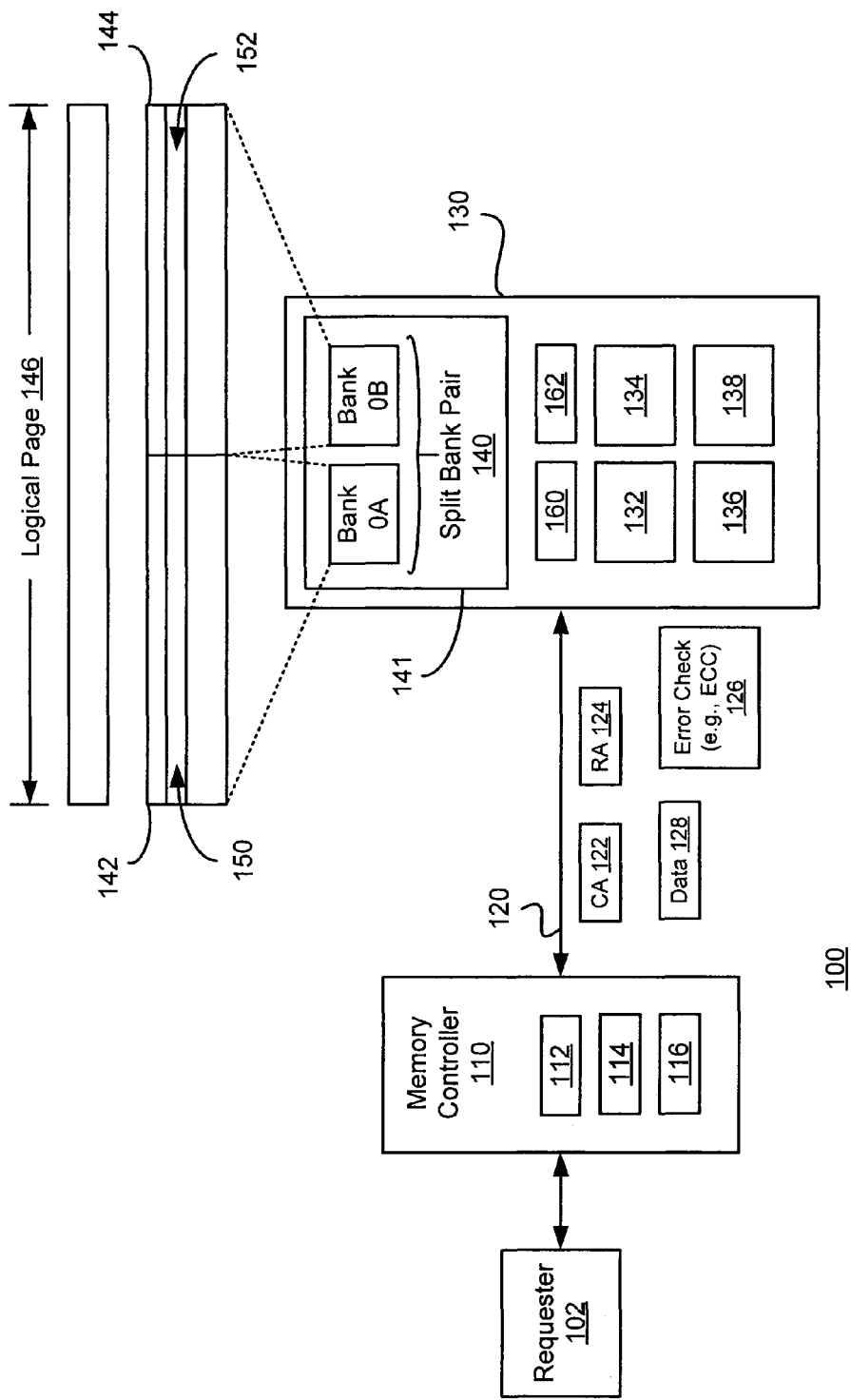
FIG. 1 is a high-level block diagram illustrating selected aspects of a computing system implemented according to an embodiment of the invention.

FIG. 1 is a high-level block diagram illustrating selected aspects of a computing system implemented according to an embodiment of the invention. Computing system 100 includes requester 102, memory controller (or host) 110, memory device 130, and interconnect 120. Memory controller 110 controls, at least in part, the transfer of information between requester 102 and memory device 130. Requester 102 may be a processor (e.g., a central processing unit and/or a core), a service processor, an input/output device (e.g., a peripheral component interconnect (PCI) Express device), memory itself, or any other element of system 100 that requests access to memory. In some embodiments, memory controller 110 is on the same die as requester 102.

In the illustrated embodiment, memory controller 110 includes error check logic 112, mode indicator 114, and memory device addressing logic 116. Error check logic 112 uses redundant information to protect data from specified faults. In some embodiments, error check logic 112 is an error correction code (ECC).

As is further discussed below, in some embodiments, memory device 130 can operate in either an error check mode or a non-error check mode. When operating in an error check mode, memory device 130 stores both data bits and corresponding error check bits (e.g., ECC bits). When operating in a non-error check mode, (substantially) the entire capacity of memory device 130 is used to store data bits. Mode indicator 114 provides an indication of whether memory device 130 is operating in an error check mode or a non-error check mode. In some embodiments, mode indicator 114 includes one or more register bits.

In some embodiments, memory device 130 applies a different address mapping for read/write data depending on whether it is in the error check mode or the non-error check mode. For example, the address mapping used in the error check mode may account for the mapping of error check bits (e.g., ECC bits). Address mapping logic 116 enables memory controller 110 to be aware of the address mapping used by memory device 130. Address mapping logic 116 may be any logic capable of providing an indication of address mapping for a number of memory locations.

Memory device 130 may be any of a wide range of devices including a dynamic random access memory device (or, simply, a DRAM). Memory core 141 may be organized into one or more split bank pairs 140. A split bank pair refers to a pair of memory banks that can be configured as either a single bank or as two separate banks. In some embodiments, each bank of the split bank pair has its own row decoder and column decoder.

In some embodiments, each bank of the split bank pair can provide a page of memory. For example, bank OA provides page 142 and bank 0B provides page 144. A "bank" refers to an array of memory locations provided by a memory device. Collectively, banks 142 and 144 can provide logical page 146. The term "logical page" refers to a logical combination of two or more physical banks. In some embodiments, pages 142 and 144 each provide 1 kilobytes (K bytes) of memory and logical page 146 provides a net effective page size of 2K bytes.

In the illustrated embodiment, memory device 130 includes mode indicator 132, posted write buffer (PWB) load logic 134, partial write mask 136, and column address generation logic 138. Mode indicator 132 provides an indication of whether memory device 130 is operating in an error check mode or a non-error check mode. In some embodiments, mode indicator 132 includes one or more bits of a register such as a mode register set (MRS). PWB load logic 134 is logic that determines, at least in part, into which element of PWB 160-162 data and/or corresponding ECC bits are posted. Partial write mask 136 provides a write mask for data that is written to the memory core. In some embodiments, partial write mask 136 is used to access error check bits associated with data stored in memory device 130. In some embodiments, column address generation logic 138 generates column address information for error check bits associated with data stored in memory device 130.

Memory device 130 may also include split PWB 160-162. A split PWB refers to a PWB that has two or more physically separate elements (e.g., elements 160 and 162). In some embodiments, each element is located close to a corresponding bank (or bank group) to which posted data is going to be retired. Each element of the split PWB may have the same index.

In some embodiments, the elements of the split PWB are both physically and logically separate if memory device 130 is operating in an error check mode. In such embodiments, PWB load logic 134 may selectively load write data to one of the elements of the split PWB and corresponding ECC bits to the other element of the PWB. In some embodiments, the elements of the split PWB are logically organized as a single PWB if memory device 130 is operating in a non-error check mode. In some embodiments, split PWB 160-162 is, logically, a 128 bit buffer that is physically divided into two 64 bit elements. In alternative embodiments, the size of split PWB 160-162 may be different.

Figure 2:
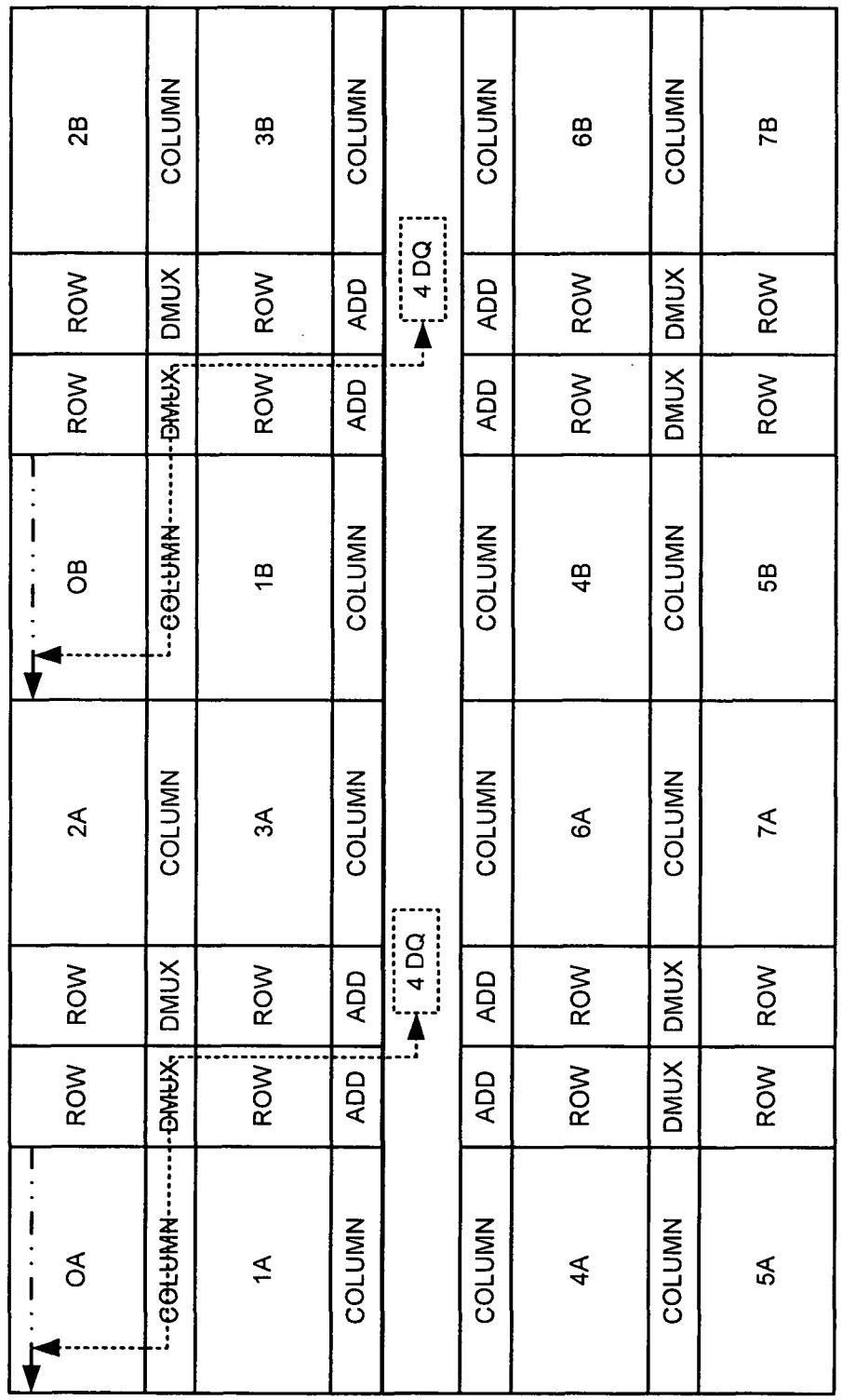
FIG. 2 is a block diagram illustrating selected aspects of a dynamic random access memory (DRAM) implemented according to an embodiment of the invention.

FIG. 2 is a block diagram illustrating selected aspects of a dynamic random access memory (DRAM) implemented according to an embodiment of the invention. DRAM 200 includes 16 memory banks (0A through 7B) or 8 split bank pairs (e.g., split bank pair 0A, 0B). In some embodiments, DRAM 200 can be configured as either a x4 or a x8 DRAM. In x4 mode, DRAM 200 provides 16 banks (0A through 7B) and each bank provides 64 bits of data to 4 data (DQ) pins. In x8 mode, DRAM 200 provides 8 split bank pairs to provide 128 bits of data to 8 DQ pins.

In some embodiments, DRAM 200 can be configured to operate in either an error check mode (e.g., an ECC mode) or a non-error check mode. When operating in an error check mode, DRAM 200 leverages its split bank architecture by storing data in one member of the split bank (e.g., bank 0A) and corresponding error check bits (e.g., ECC bits) in the other member of the split bank (e.g., bank 0B). In some embodiments, DRAM 200 is configured as a x8 DRAM when it is operating in the error check mode.

Figure 3:
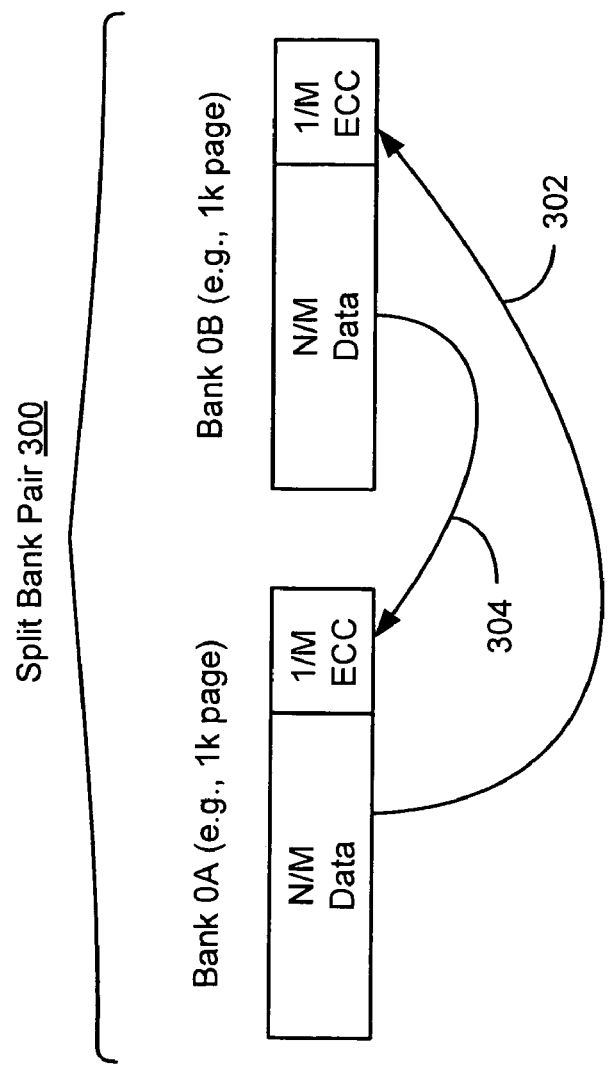
FIG. 3 is a block diagram illustrating selected aspects of a dynamic random access memory (DRAM) implemented according to an embodiment of the invention.

FIG. 3 is a block diagram illustrating selected aspects of storing data bits and error check bits in a split bank pair, according to an embodiment of the invention. Split bank pair 300 includes bank 0A and bank 0B. In some embodiments, data is stored in up to N/Mths (e.g., ⅞ths) of the locations in each bank and corresponding error check bits are stored in the last 1/Mth (e.g., ⅛) of the other member of split bank pair 300. For example, the error check bits covering the data stored in bank 0A may be stored in the top ⅛th of the memory locations of bank 0B (302). Similarly, the error check bits covering the data stored in bank 0B may stored in the top ⅛th of the memory locations of bank 0A (304). In some embodiments, the error check bits are error check code (ECC) bits.

In some embodiments, a host (e.g., memory controller 110, shown in FIG. 1) addresses a specific bank in the split bank pair to identify the bank that is receiving/providing the data bits. If the memory device is in the error check mode, then it uses its internal logic (e.g., partial write mask 136, column address generation logic 138, etc., shown in FIG. 1) to access the error check bits corresponding to the data bits.

Figure 4:
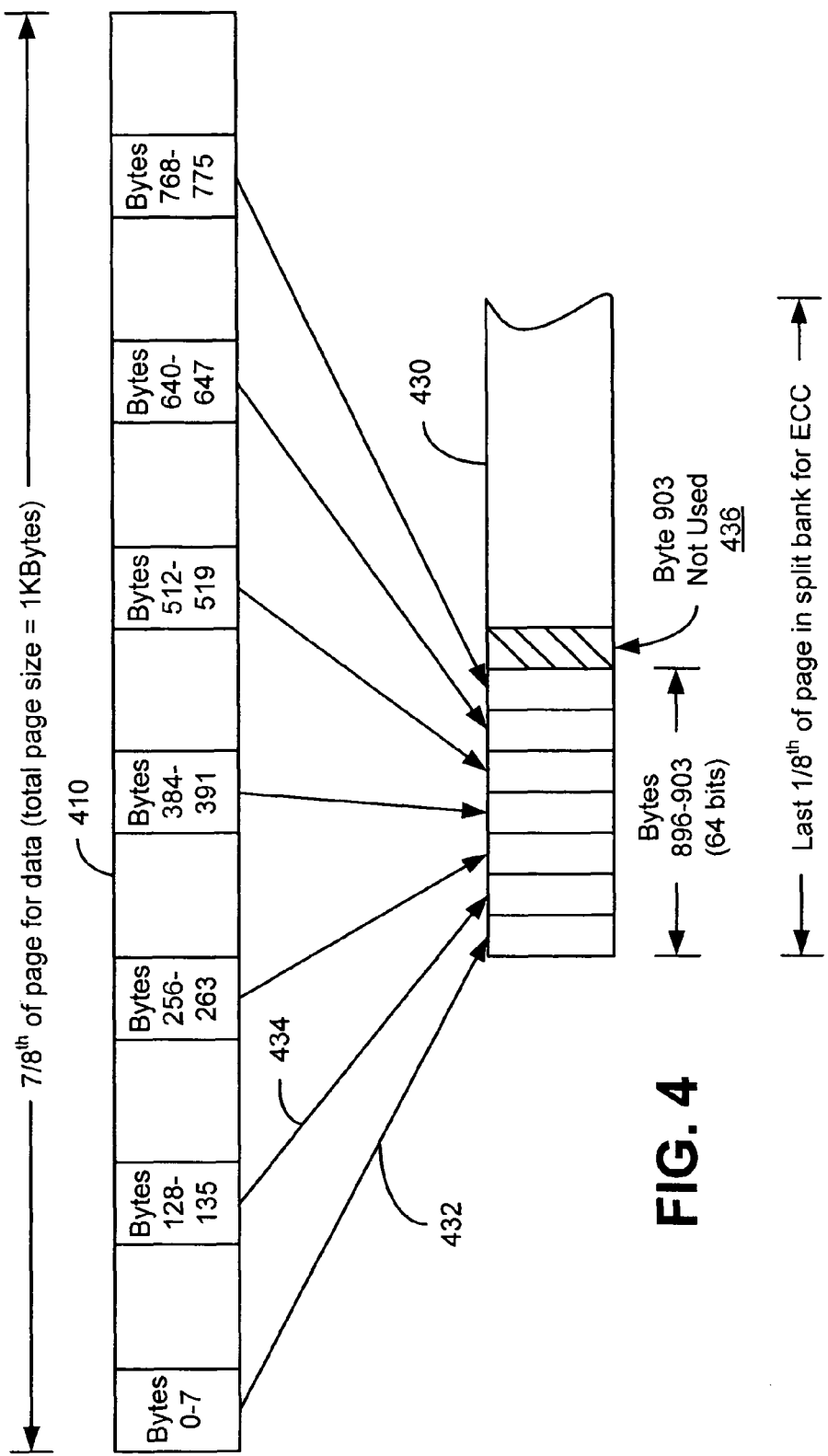
FIG. 4 is a block diagram illustrating an example of the address mapping between data bits and error check bits, according to an embodiment of the invention.

FIG. 4 is a block diagram illustrating an example of the address mapping between data bits and error check bits, according to an embodiment of the invention. In the illustrated embodiment, the data bits are stored in ⅞ths of a page that is provided by a bank within a split pair of banks as shown by 410. The corresponding error check bits are stored in the upper ⅛th of the other bank in the split bank pair (430). For example, the ECC bits covering bytes 0-7 are stored at memory location 896 as shown by reference number 432. Similarly, the ECC bits covering bytes 128-135 are stored at memory location 897 as shown by reference number 434 and this pattern is continued for the data bytes in page 410 as shown in FIG. 4. In some embodiments, the last byte of the upper ⅛th of bank 430 (e.g., location 903) is not used as shown by reference number 436. In some embodiments, the error check bits covering bytes 8-15 are stored in location 905 and the sequence repeats itself.

FIGS. 5A and 5B illustrate selected aspects of a sequence of write data frames, according to an embodiment of the invention. The write sequence illustrated in FIGS. 5A and 5B may be used in a system having a parallel memory channel with two memory devices. Each device sees all four frames and is assigned either D0 to D63 or D64 to D127. The assignment of memory devices is further discussed below.

In some embodiments, a write sequence includes the following frames: write header (Wh) 502, ECC write frame (We) 504, write data 1 (Wd1) 506, and write data 2 (Wd2) 508. In some embodiments, each frame is a six-bit frame (labeled 0 to 5) that is nine bits deep (e.g., unit intervals 0 to 8 or 9 to 17). Wh 502 includes header information for the write sequence as well as some data bits.

We 504 transfers the error check bits (e.g., ECC bits 510, shown in UIs 12-15) that cover the associated data bits. In some embodiments, the error check bits (e.g., ECC bits) are transferred to memory device 130 using partial write mask encoding. That is, We 504 may have the same command encoding as a partial write mask frame (Wm) except that the mask bits are replaced by error check bits (e.g., ECC bits 510, shown in unit intervals 12-15). ECC bits ECC0-ECC7 cover data bits D0-D63 and ECC bits ECC8-ECC15 cover data bits D64-D127. In some embodiments, We frame 504 is required for all write data transfers when the system is operating in the error check mode.

In some embodiments, address bit g1 (512) is provided with We 504 to enable loading of split PWB implementations. For example, PWB load logic (e.g., 134, shown in FIG. 1) may determine into which element of a split PWB write data (or ECC bits) are to be loaded based, at least in part, on address bit g1 (512). In some embodiments, it is optional for a memory device to use g1 in connection with loading the PWBs. It is to be appreciated that, in some embodiments, more than one address bit may be used and/or the position of the address bit (or bits) within a frame (or frames) may be different.

Wd1 506 and Wd2 508 transfer the rest of the data bits for the write operation. Data bits D0-D63 are used by one memory device and D64-D127 are used by another memory device. In some embodiments a register bit within a memory device determines which memory device picks up which data bits. For example, the MRS register may be used to assign data bits to a memory device.

Figure 6:
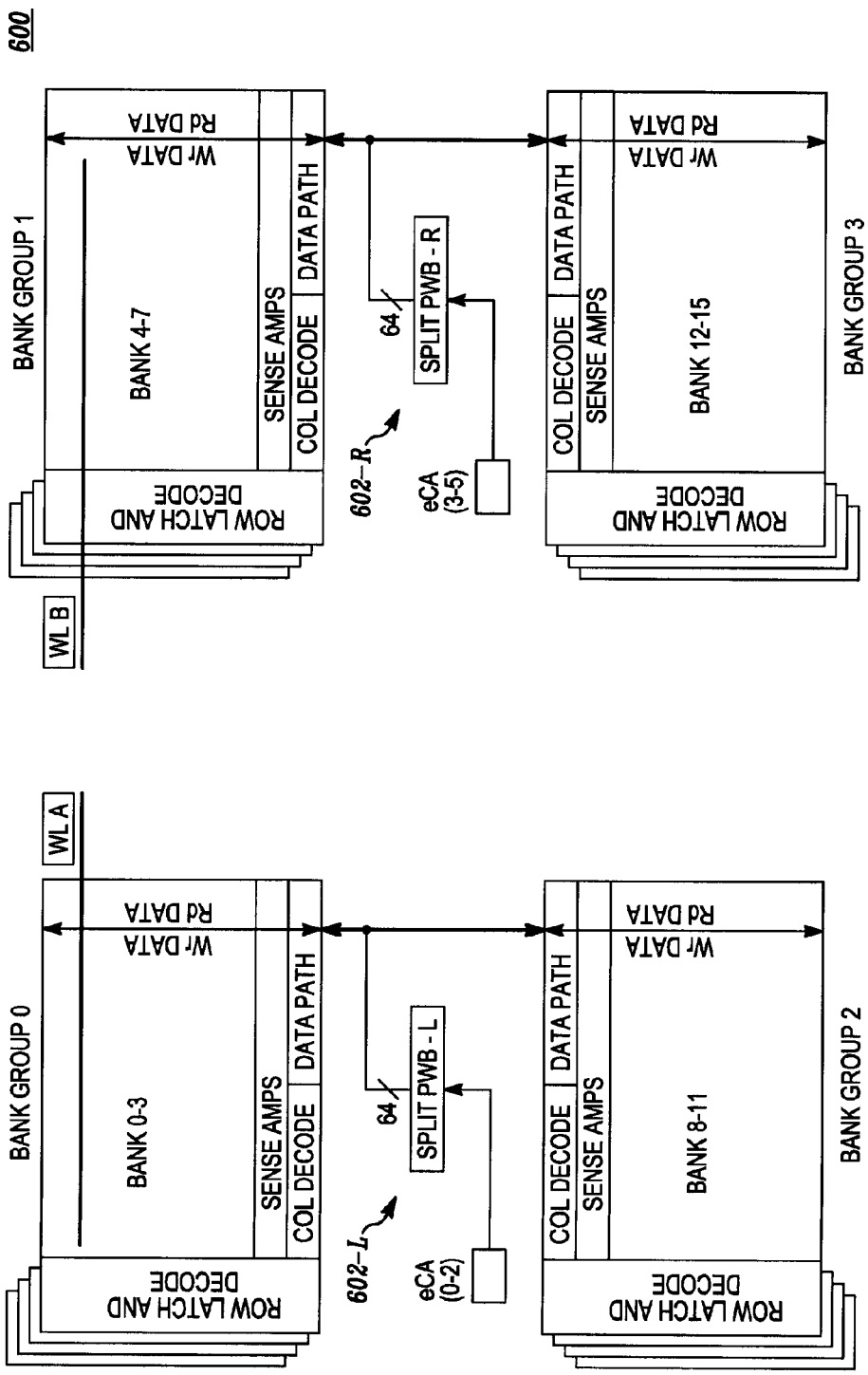
FIG. 6 is a block diagram illustrating selected aspects of a memory device having a split posted write buffer, according to an embodiment of the invention.

FIG. 6 is a block diagram illustrating selected aspects of a memory device having a split PWB, according to an embodiment of the invention. In some embodiments, memory device 600 (e.g., a DRAM) includes, inter alia, bank groups 0 through 3 and split PWB 602 having elements 602-L and 602-R. Each of elements 602-L and 602-R are located close to a corresponding bank group. For example, element 602-L is located close to bank groups 0 and 2. Similarly, element 602-R is located close to bank groups 1 and 3.

In some embodiments, elements 602-L and 602-R are logically part of a single PWB 602, if memory device 600 is operating in a non-error check mode. If memory device 600 is operating in an error check mode, however, then write data is loaded into one element of split PWB 602 and the corresponding ECC bits are loaded into the other element of split PWB 602.

In some embodiments, a destination indication is used to help with loading the write data (and/or the ECC bits) into the elements of the split PWB. For example, one or more of the write frames may include an address bit (e.g., address bit 512, shown in FIG. 5A) to indicate into which element of the split PWB data bits should be written and into which element ECC bits should be written.

In some embodiments, address, command, and write data are multiplexed onto an "eCA" bus. The lanes of the eCA bus may be partitioned so that some data bits (e.g., 64 data bits) are sent to one side of the memory device and the remaining data bits (e.g., the remaining 64 data bits) are sent to the other side of the memory device. For example, in the illustrated embodiment, lanes 0-2 are routed to the left side of memory device 600 and lanes 3-5 are routed to the right side of the memory device. In some embodiments, the write frames are organized in a way that leverages the partitioning of the eCA bus lanes. For example, bits D0-D63 may be located in lanes 0-2 of a write frame (e.g., 502 of FIG. 5A). Similarly, bits D64-D127 may be located in lanes 3-5 of the write frame.

Figure 7:
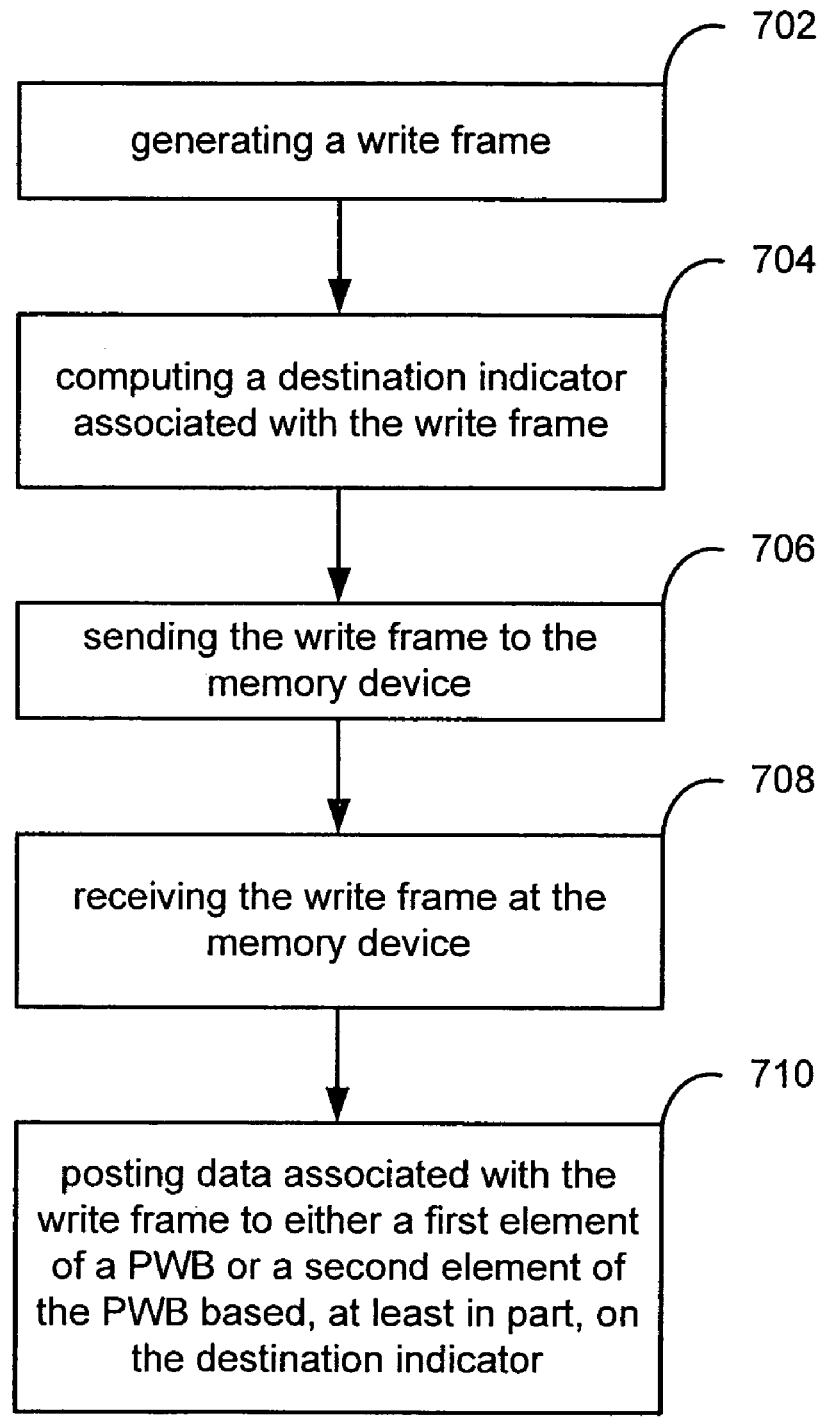
FIG. 7 is a flow diagram illustrating selected aspects of using a destination indicator to aid in loading a posted write buffer, according to an embodiment of the invention.

FIG. 7 is a flow diagram illustrating selected aspects of using a destination indication to aid with loading a split PWB, according to an embodiment of the invention. Referring to process block 702, a memory controller (e.g., memory controller 110, shown in FIG. 1) generates a write frame. At 704, the memory controller (or other logic) computes a destination indicator associated with the write frame. In some embodiments, the destination indicator indicates into which element of a split PWB data is to be written. Referring to process block 706, the memory controller sends the write frame, including the destination indication, to a memory device which receives it at 708.

In some embodiments, PWB load logic (e.g., PWB load logic 134, shown in FIG. 1) determines into which element of the split PWB the data bits are to be loaded based, at least in part, on the destination indication (710). For example, if the destination indication has a first value (e.g., a logical 1) then the data bits may be loaded into a first element of the split PWB (e.g., 602-L, shown in FIG. 6). The corresponding ECC bits may be loaded into a different element of the split PWB (e.g., 602-R, shown in FIG. 6). In some embodiments, the destination indication is one or more address bits (e.g., address bit 512, shown in FIG. 5A). In alternative embodiments, the destination indication may be nearly any indication conveyed in a write frame.

Figure 8:
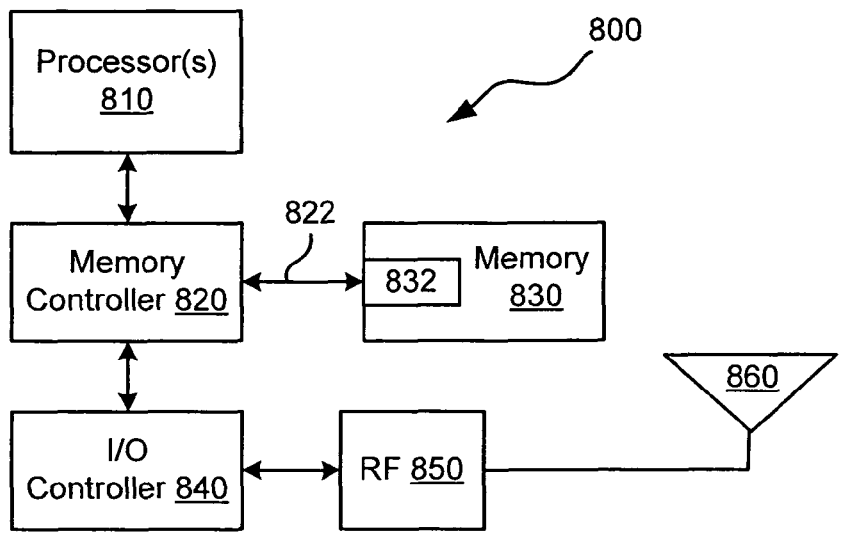
FIG. 8 is a block diagram illustrating selected aspects of an electronic system according to an embodiment of the invention.

FIG. 8 is a block diagram illustrating selected aspects of an electronic system according to an embodiment of the invention. Electronic system 800 includes processor 810, memory controller 820, memory 830, input/output (I/O) controller 840, radio frequency (RF) circuits 850, and antenna 860. In operation, system 800 sends and receives signals using antenna 860, and these signals are processed by the various elements shown in FIG. 8. Antenna 860 may be a directional antenna or an omni-directional antenna. As used herein, the term omni-directional antenna refers to any antenna having a substantially uniform pattern in at least one plane. For example, in some embodiments, antenna 860 may be an omni-directional antenna such as a dipole antenna or a quarter wave antenna. Also, for example, in some embodiments, antenna 860 may be a directional antenna such as a parabolic dish antenna, a patch antenna, or a Yagi antenna. In some embodiments, antenna 860 may include multiple physical antennas.

Radio frequency circuit 850 communicates with antenna 860 and I/O controller 840. In some embodiments, RF circuit 850 includes a physical interface (PHY) corresponding to a communication protocol. For example, RF circuit 850 may include modulators, demodulators, mixers, frequency synthesizers, low noise amplifiers, power amplifiers, and the like. In some embodiments, RF circuit 850 may include a heterodyne receiver, and in other embodiments, RF circuit 850 may include a direct conversion receiver. For example, in embodiments with multiple antennas 860, each antenna may be coupled to a corresponding receiver. In operation, RF circuit 850 receives communications signals from antenna 860 and provides analog or digital signals to I/O controller 840. Further, I/O controller 840 may provide signals to RF circuit 850, which operates on the signals and then transmits them to antenna 860.

Processor(s) 810 may be any type of processing device. For example, processor 810 may be a microprocessor, a microcontroller, or the like. Further, processor 810 may include any number of processing cores or may include any number of separate processors.

Memory controller 820 provides a communication path between processor 810 and other elements shown in FIG. 8. In some embodiments, memory controller 820 is part of a hub device that provides other functions as well. As shown in FIG. 8, memory controller 820 is coupled to processor(s) 810, I/O controller 840, and memory 830.

Memory 830 may include multiple memory devices. These memory devices may be based on any type of memory technology. For example, memory 830 may be random access memory (RAM), dynamic random access memory (DRAM), static random access memory (SRAM), nonvolatile memory such as FLASH memory, or nay other type of memory. Memory 830 may support an error check mode and a non-error check mode. In some embodiments, memory 830 includes PWB load logic 832 which is capable of selectively loading data bits and/or ECC bits into an element of a split PWB based, at least in part, on a destination indication.

Memory 830 may represent a single memory device or a number of memory devices on one or more modules. Memory controller 820 provides data through interconnect 822 to memory 830 and receives data from memory 830 in response to read requests. Commands and/or addresses may be provided to memory 830 through interconnect 822 or through a different interconnect (not shown). Memory controller 820 may receive data to be stored in memory 830 from processor 810 or from another source. Memory controller 820 may provide the data it receives from memory 830 to processor 810 or to another destination. Interconnect 822 may be a bi-directional interconnect or a unidirectional interconnect. Interconnect 822 may include a number of parallel conductors. The signals may be differential or single ended. In some embodiments, interconnect 822 operates using a forwarded, multiphase clock scheme.

Memory controller 820 is also coupled to I/O controller 840 and provides a communications path between processor(s) 810 and I/O controller 840. I/O controller 840 includes circuitry for communicating with I/O circuits such as serial ports, parallel ports, universal serial bus (USB) ports and the like. As shown in FIG. 8, I/O controller 840 provides a communication path to RF circuits 850.

Figure 9:
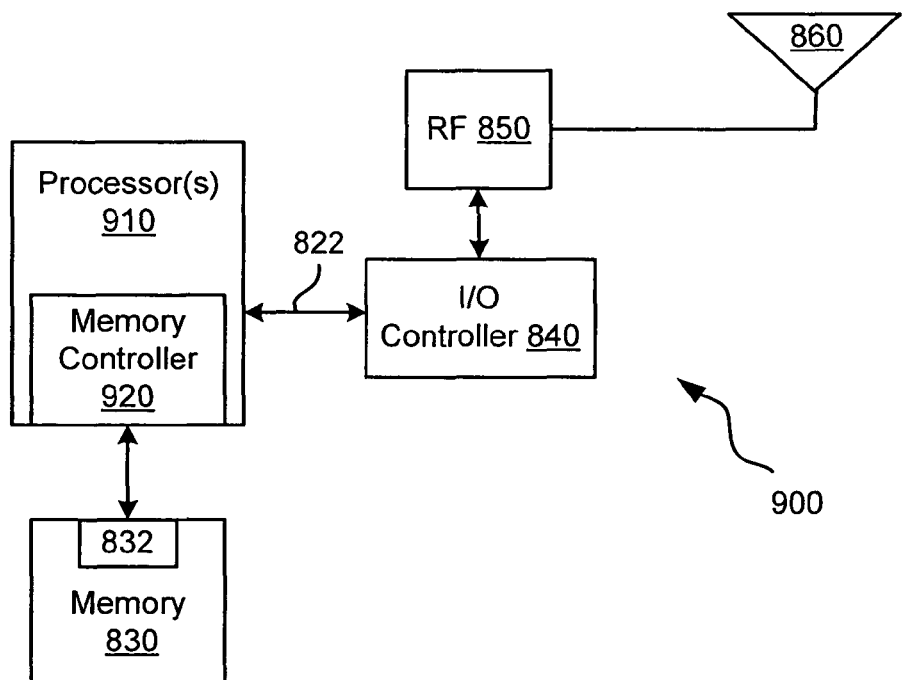
FIG. 9 is a bock diagram illustrating selected aspects of an electronic system according to an alternative embodiment of the invention.

FIG. 9 is a bock diagram illustrating selected aspects of an electronic system according to an alternative embodiment of the invention. Electronic system 900 includes memory 930, I/O controller 940, RF circuits 950, and antenna 960, all of which are described above with reference to FIG. 9. Electronic system 900 also includes processor(s) 910 and memory controller 920. As shown in FIG. 9, memory controller 920 may be on the same die as processor(s) 910. Processor(s) 910 may be any type of processor as described above with reference to processor 910 (FIG. 5). Example systems represented by FIGS. 8 and 9 include desktop computers, laptop computers, servers, cellular phones, personal digital assistants, digital home systems, and the like.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. A volatile memory device formed on an integrated circuit, the memory device comprising:
    a memory array having a first memory array portion and a second memory array portion;
    a posted write buffer (PWB) coupled with the memory array, wherein the posted write buffer includes a first PWB element located proximate to the first memory array portion and a second PWB element located proximate to the second memory array portion; and
    logic to detect a destination indication associated with received write data, wherein the logic determines whether to store the received write data in the first PWB element or the second PWB element based, at least in part, on the destination indication.

2. The memory device of claim 1, wherein if the received write data is to be stored in first PWB element, then corresponding error correction code (ECC) is stored in the second PWB element.

3. The memory device of claim 1, wherein the first PWB element of the posted write buffer is physically separate from the second PWB element of the posted write buffer.

4. The memory device of claim 3, wherein the first PWB element of the posted write buffer is located on a first side of the memory device and the second PWB element of the posted write buffer is located on a second side of the memory device.

5. The memory device of claim 1, further comprising:
    a memory core having a first portion to store data bits and a second portion to store error correction code (ECC) bits corresponding to the data bits.

6. The memory device of claim 5, wherein the memory core includes a split bank pair of memory banks having a first memory bank corresponding to the first portion and a second memory bank corresponding to the second portion.

7. The memory device of claim 6, wherein data bits are to be stored in the first memory bank and corresponding ECC bits are to be stored in the second memory bank.

8. The memory device of claim 6, wherein the memory device is capable of operating in a memory check mode and a non-error check mode.

9. The memory device of claim 1, wherein the memory device comprises a dynamic random access memory (DRAM) device.

10. A system comprising:
    a memory controller; and
    a memory device formed on an integrated circuit the memory device coupled with the memory controller, the memory device including
        a memory array having a first memory array portion and a second memory array portion;
        a posted write buffer (PWB) coupled with the memory array, wherein the posted write buffer includes a first PWB element located proximate to the first memory array portion and a second PWB element located proximate to the second memory array portion; and
        logic to detect a destination indication associated with received write data, wherein the logic determines whether to store the received write data in the first PWB element or the second PWB element based, at least in part, on the destination indication.

11. The system of claim 10, wherein data is to be stored in the first PWB element if the corresponding error correction code (ECC) is stored in the second PWB element.

12. The system of claim 11, wherein the first PWB element of the posted write buffer is physically separate from the second PWB element of the posted write buffer.

13. The system of claim 10, wherein the memory controller includes logic to generate a destination indicator associated with the write data.

14. The system of claim 13, wherein the memory device includes a memory core having a first portion to store the one or more data bits and a second portion to store the one or more ECC bits.

15. The system of claim 14, wherein the memory core includes a split bank pair of memory banks having a first memory bank corresponding to the first portion and a second memory bank corresponding to the second portion.

16. The system of claim 15, wherein the memory device is capable of operating in an error check mode and a non-error check mode.

* * * * *